United States Patent [19]

Walzer et al.

[11] Patent Number: 4,884,475
[45] Date of Patent: Dec. 5, 1989

[54] AUTOMOTIVE DRIVE SYSTEM FOR MACHINES AND VEHICLES

[75] Inventors: Winfried Walzer, Elchingen; Wolfgang Reistle, Hövelsingen, both of Fed. Rep. of Germany

[73] Assignee: Hydromatik GmbH, Elchingen, Fed. Rep. of Germany

[21] Appl. No.: 174,845

[22] Filed: Mar. 29, 1988

[30] Foreign Application Priority Data

Jan. 14, 1988 [DE] Fed. Rep. of Germany ....... 3800893

[51] Int. Cl.$^4$ ............................................ B60K 41/16
[52] U.S. Cl. ......................................... 74/862; 60/434
[58] Field of Search .................... 74/861, 862, 844; 60/434, 492

[56] References Cited

U.S. PATENT DOCUMENTS

| | | | |
|---|---|---|---|
| 4,285,252 | 8/1981 | Yamaki et al. | 74/862 X |
| 4,546,847 | 10/1985 | Abels | 60/492 X |
| 4,622,867 | 11/1986 | Nishioka et al. | 74/862 X |
| 4,726,186 | 2/1988 | Tatsumi | 60/434 |

FOREIGN PATENT DOCUMENTS

| | | | |
|---|---|---|---|
| 0253657 | 1/1988 | European Pat. Off. | 74/862 |
| 3121160 | 3/1982 | Fed. Rep. of Germany. | |
| 3436190 | 4/1985 | Fed. Rep. of Germany. | |
| 3439882 | 5/1985 | Fed. Rep. of Germany. | |
| 2057605 | 4/1981 | United Kingdom | 74/861 |
| 2066429 | 7/1981 | United Kingdom | 74/862 |

Primary Examiner—Dirk Wright
Attorney, Agent, or Firm—Scully, Scott, Murphy & Presser

[57] ABSTRACT

An automotive drive system for machines and vehicles, comprising a driving motor the speed of which can be continuously varied by means of a control member and a converter having control means for controlling its output speed in dependence on a depression of the speed of the driving motor determined by means of signal transmitters is arranged so that the power or torque available from the driving motor is better employed. This is achieved by controlling (adjusting) the converter to minimum transmission ratio independently of the driving motor speed when the driving motor speed resulting during operation of the drive system is greater than the driving motor speed given by a predetermined speed(rotation) depression, and on reaching the predetermined speed (rotation) depression the converter is controlled in dependence on the driving motor speed so that the driving motor speed does not fall below the controlling characteristic curve corresponding to the predetermined speed (rotation) depression.

14 Claims, 2 Drawing Sheets

AUTOMOTIVE DRIVE SYSTEM FOR MACHINES AND VEHICLES

TECHNICAL FIELD OF THE INVENTION

The invention relates to a drive system for motor vehicles such as construction equipment, including excavators, wheel loaders and bulldozers.

BACKGROUND OF THE INVENTION AND PRIOR ART

A driving motor of which the speed can be continuously varied by means of a control member produces a torque that is nearly independent of the speed. Vehicles and working machines however require variable driving forces to overcome resistance to travel such as inclines, to produce thrust and/or tractive forces or for acceleration. Hence it should be possible to convert the installed driving power as completely as possible into working power in the drive system. This requirement is met by a converter connected between the driving motor and the drive shaft of the drive system, having a speed controller that controls the converter in accordance with the load condition of the driving motor in response to control or regulating signals that correspond to the load condition, so that the speed depression of the driving motor does not exceed a desired amount. Speed(rotation) depression is the name given to the difference between, or ratio of, the speed of the driving motor preset by the control member and the speed which results under the load. A particularly suitable converter is a hydrostatic transmission, because of its constructional advantages and of the possibility of intervention in the adjustment of the hydraulic pump and/or hydraulic motor. A mechanical converter, for example a continuously variable mechanical transmission, can however be used.

A known drive system of the above-mentioned kind is used as a vehichle driving system, particularly for constructional vehicles such as wheel loaders, excavators and bulldozers, for both forward and backward travel, and has a hydrualic control device with an adjusting piston that is centered by means of springs. The adjusting piston is connected to the swivelling rocker of the hydraulic pump. A direction-of-travel valve connected ahead of it determines the direction of adjustment of the adjusting piston and thus the direction of delivery of the hydraulic pump. The extent of the adjusting displacement, and thus the amount of the delivery volume of the hydraulic pump, depends on the magnitude of the control pressure that is produced by an auxiliary group of constant delivery volume, driven synchronously with the hydraulic pump, and acts on the adjusting piston. The delivery flow of the auxiliary pump, which is proportional to the speed, produces a pressure drop at an orifice, which is used to set the control pressure by means of a control piston. Such a control valve, which in the present field is known as a "pressure balance" or "pressure compensator" is described and illustrated in No. DE-PS-22 47 437.

A drive system has also been proposed in which there is a predetermined fixed relationship (control characteristic) between the control member of the driving motor and the adjusting member of the associated converter in order to set the speed and/or delivery thereof,overloading (stalling) of the driving motor being prevented by a load limiting control.

In the drive system described above, if the depression of the driving motor is too great the associated converter is controlled so that the speed of the driving motor does not fall below a specified value, so that, in the case of a internal combustion engine such as a diesel engine, stalling is avoided, and when there is a subsequent change-speed gear a speed range that is appropriate in respect of power ulitization and fuel consumption is aimed at.

All these known kinds of drive systems have a fixed control characteristic whereby the speeds of the driving motor from which the load limiting control comes into operation are fixed.

Thus if for example at a particular position of the gas pedal the permissible speed (rotation) depression of the driving motor (which is defined by the fixed control characteristic) is not exceeded, in the known arrangements the converter is controlled so that as the speed of the driving motor increases the transmission ratio increases, which in the case of a hydrostatic transmission is brought about by an increase in the pump delivery flow.

If, as a result of resistance to travel, the permissible speed depression of the driving motor is exceeded, the converter is no longer controlled proportionally to the speed, as described above, but is then adjusted or regulated so that the speed of the driving motor does not fall below that corresponding to the fixed control characteristic (load limiting control, i.e. anti-stalling control).

The known arrangements have the following disadvantages:

changes in the control and regulating characteristic because of wear of hydraulic control parts, e.g. orifices, spools and the like, or of mechanical control parts such as control members, gas (accelerator) rods and other adjusting rods;

after intervention in the system, for example change of the driving motor, injection pumps, gas rods or hydraulic units, partial or complete resetting is needed;

high setting-up costs;

temperature dependence;

viscosity dependence (in the case of hydraulic control devices);

in the case of a converter with speed-dependent adjustment (e.g. setting of the delivery volume of the pump) the power of the driving motor is used inefficiently, particularly in the lower speed region; and the maximum power supplied by the driving motor cannot be set.

OBJECT OF THE INVENTION

The object of the invention is to provide a drive system of the kind described above such that the power available from the driving motor, or the available torque, is better used.

SUMMARY OF THE INVENTION

The arrangement according to the invention gives a drive system in which the converter is not adjusted according to the speed of the driving motor (i.e. no speed-proportional adjustment) but in which the converter is adjusted according to the learned characteristic applicable to the permissible speed(rotation) depression of the driving motor. The known speeddependent adjustment is thus replaced, within the scope of the invention, by an adjustment that depends on the speed depression.

Thus if the permissible speed rotation depression associated with a given position of the control member is not reached, because the resistance to travel is too low, the converter is controlled to a minimum transmission ratio:

i=input speed/output speed.

Accordingly the speed of travel of the machine or vehicle is then only changed through the variations in the speed of the driving motor and not by changing the transmission ratio.

If the permissible speed depression associated with the particular position of the control member is reached, owing to increased resistance to travel, the converter is controlled so that the speed of the driving motor does not fall below the applicable characteristic curve.

This arrangement thus enables good utilization of power and/or torque to be obtained.

The invention includes further arrangements which lead to a drive system having a control device into which the relationship between each position of the control member and the associated speed of the driving motor can be entered or programmed or which is able to learn the relationship or to record it by generating a characteristic (learning curve) depending on the kind and setting of the driving motor. The independence from a predetermined setting of the driving motor that is aimed at is hereby achieved.

The problem with which these improvements are related arises in particular when parts of the control means of the driving motor, such as the rods, the injection pump and/or the carburetor, become worn or are exchanged or readjusted, resulting in substantial differences from a characteristic which has been predetermined, for example by the characteristics of a spring. In the case of an arrangement according to the invention the effective control characteristic is generated or learned from a basic control characteristic which has been produced taking into account the fine details of the control members, whereby even after wear or exchange of individual parts of the driving motor the characteristic conforms with the constructional and/or functional reality of the individual parts if it is generated or learned after the wear and/or after the readjustment of the individual parts has occurred. It is therefore advantageous to make the arrangement such that the control characteristic can if desired be erased and a new control characteristic stored.

Variable setting of the permissible speed (rotation) depression enables both the control response of the driving motor load limiting control and the driving response and the power development of the machine or vehicle driven by the drive system, particularly in the low to medium speed region, to be influenced. It is possible for the characteristic to be displaced or moved, stored or learned either automatically through the processor or set as desired by means of a setting member.

The solutions according to the invention can be realized as vehicle driving (moving) means and as machine driving means. For example the driving and/or working hydraulics of an excavator or wheel loader can be controlled according to the invention so that the deviation from the characteristic does not exceed an amount of speed depression the setting of which can be varied.

Such as excavator could then operate with the above-described limiting load control with the possibility of varying the diesel engine speed (a lower diesel engine speed in residential areas but full diesel engine speed in the open). Known excavators are always operated with a fixed diesel engine speed corresponding to the maximum diesel engine speed. The invention overcomes this disadvantage.

BRIEF DESCRIPTION OF THE DRAWINGS

The invention will now be described in more detail with reference to an exemplary embodiment shown in the drawings, in which.

DETAILED DESCRIPTION OF A PREFERRED EMBOIDMENT OF THE INVENTION

Figure 1:
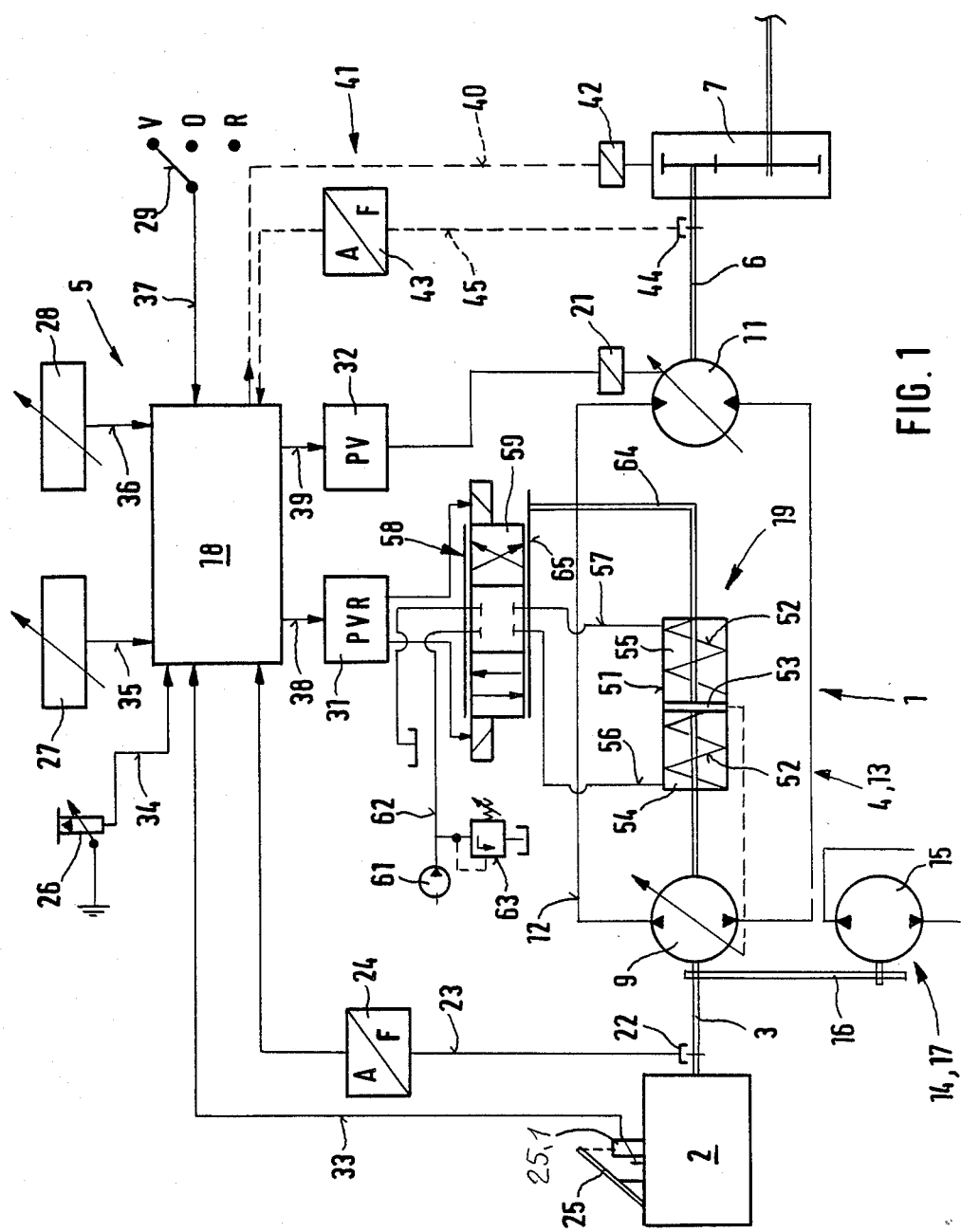
FIG. 1 is a diagrammatic representation of a drive system according to the invention.

The drive system indicated generally by 1 is installed as the moving drive for a constructional machine such as a wheel loader, a bulldozer or a drivable excavator. The essential parts of the drive system 1 are an internal combustion engine in the form of a diesel engine as the driving motor 2, a hydrostatic transmission 4, driven by the drive shaft 3 of the driving motor 2, having control means indicated generally by 5, and a mechanical gearbox 7, preferably a load shift gear, connected to the drive shaft 6 of the hydrostatic transmission 4. The hydrostatic transmission 4 includes a hydraulic pump 9 driven by the drive shaft 3 and a hydraulic motor 11, of which the delivery and intake volumes respectively are adjustable and which are installed to operate in both directions of rotation. The working line connecting the hydraulic units of the hydrostatic transmission 4 to one another in closed circuit is designated 12.

Beside the hydrostatic transmission, which is also, together with the movement hydraulics, designated 13, the drive system 1 also includes a second hydrostatic transmission 14 with a hydraulic pump 15, shown only partially, which is connected through a power divider 16 with the driving shaft 3 of the driving motor 2 and is provided for driving a further working device of the construction machine, more particularly for driving the loading scoop of a wheel loader. The second hydraulic transmission is also designated as working hydraulics 17. The control means 5 can also take account of the pump 14 of the working hydraulics 17 and adjust it according to the control algorithm already described.

The control means 5 has associated with it an electronic control device 18 and an electroproportional adjusting device 19 for the hydraulic pump 9 and possibly also an electro-proportional adjusting device 21 for the hydraulic motor 11. The latter adjusting device 21 is shown symbolically. Further regulating or control members of the control means 5 are a revolution counter 22 on the driving shaft 3 of the driving motor 2, which is connected via a signal line 23 with the electronic control device 18 in which a frequency analog converter 24 is arranged, a position or path measurement device, formed by a potentiometer 25.1,for the gas pedal 25 of the driving motor, a switch for selecting the type of operation 26, a motor depression setting member comprising a potentiometer 27, a setting member 28 for so-called "inching", a switch 29 for selecting the direction of travel, and proportional amplifiers 31, 32 that are connected via signal lines 33 to 39 with the electronic control device 18. The electronics of the control device 18 comprises a memory or microcomputer with analog and digital inputs and outputs which is able to generate and store the control characteristic curve of the control means 17 according to the positions of the gas pedal 25 and associated speeds of the drive shaft 3.

In addition the drive system can have associated with it an automatic gear shifting means 41 that is indicated by a shifting member 42, in shifting drive connection with the mechanical gearbox 7, comprising for example a shifting magnet, a frequency-analog converter 43 and a revolution counter 44 on the output shaft 6 of the hydrostatic transmission 4. The revolution counter 44 is connected via a signal line 45 and through the converter 43 with the electronic control device 18. The shifting member 42 is connected via a signal line 40 with the electronic control device 18.

The manner in which the self-educating, processor-controlled automotive vehicle drive 1 functions is as follows:

Before the driving system 1 is put into operation for the first time, the idling curve (learning curve) of the driving motor 2 must be "programmed" with the aid of the operation-type switch 26. This is done simply by operating the operation-type switch 26 once and slowly accelerating the driving motor 2 in the non-loaded state up to its maximum speed. During this "learning process" the processor in the electronic control device 18 stores the relationship between the position of the gas pedal and the associated idling speed of the driving motor 2, in the present case a diesel engine, as a "learning curve" in a particular region of the memory (battery-buffered RAM - random access memory).

Figure 2:
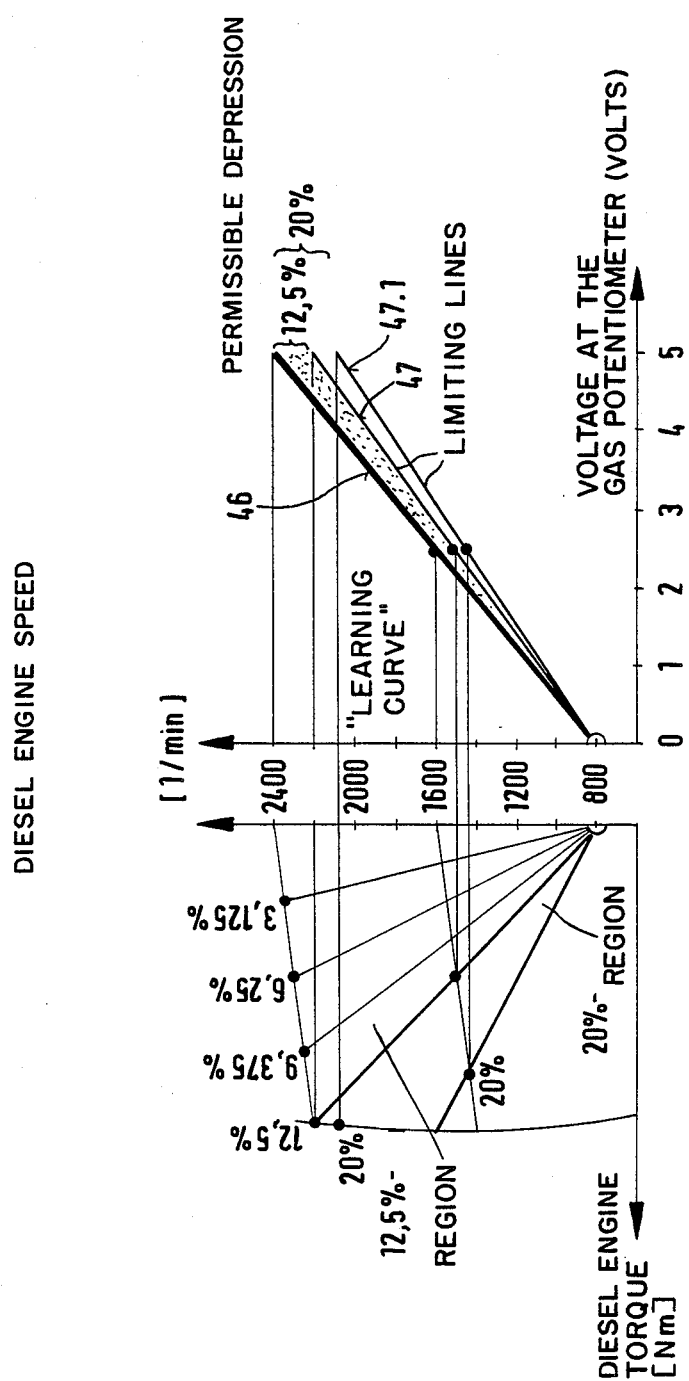
FIG. 2 is a functional diagram of the drive system.

FIG. 2 shows the functional diagram, wherein the voltage at the gas pedal potentiometer 25.1, the speed of the diesel engine and the torque of the diesel engine 2 at different settings of the injection pump of the diesel engine are plotted on the three axes.

Any desired motor depression in a range of adjustment can be preset by setting it on the motor depression potentiometer 27, whereby an effective or controlling characteristic curve 47 is generated which is displaced relative to the learned characteristic curve 46 and can run parallel to or displaced at an angle from the learned characteristic curve 46 or in any desired mathematically unambiguous relationship thereto. In this way it is possible to limit the use of the power of the driving motor 1. In the functional diagram two controlling characteristic curves or limiting lines 47, 47.1, one for about 12.5% and one for 20% permissible speed depression of the diesel engine 2, are plotted by way of example.

After the learning process is completed the permissible speed depression can be set at any desired value between zero and 20% by operating the intended depression value potentiometer 27. By varying the setting of the permissible speed depression the maximum torque that can be taken off from the diesel engine 2 (at the driving speed set at the time by means of the gas pedal) can be influenced, as well as the control response of the diesel engine load limiting control.

For simplicity the relationship between the positions or the travel of the gas pedal potentiometer 25.1 and the speed of the diesel engine is plotted as a straight line. It can however, take any desired mathematically single-valued continuous functional form.

Unlike the long-known automotive vehicle drives, in which the electro-proportion adjusting device is adjusted simultaneously with increasing operation of the driving gas pedal (gas-dependent control) the drive system 1 of the invention does not require any such "control characteristic".

The drive system of the invention operates in the speed range above the controlling characteristic curves 47, 47.1 as a control and below it as a regulator wherein the minimum permissible speed of the diesel engine associated with the respective setting of the gas pedal potentiometer (learning curve minus permissible depression) constitutes the command variable and the instantaneous speed of the diesel engine 2 constitutes the controlled variable.

Under all operating conditions in which, as a result of too low a loading of the drive system the set permissible depression of the diesel engine speed is not exceeded, so that the regulation is not necessary, the hydraulic pump 9 is adjusted to maximum delivery volume. Consequently the speed of the constructional machine or vehicle in this operating condition depends only on the speed of the diesel engine 2.

When the vehicle is stopped the permissible depression is zero. This means that the hydraulics cannot load the diesel engine 2 at all, since the control device 5 then likewise sets the hydraulic pump 9 at zero. However, as soon as the driver operates the gas pedal 25, and thus increases the voltage at the potentiometer 25.1 an increasing permissible slowing down of the speed of the diesel engine 2 results, which has the effect that the hydraulic pump 9 begins to swing out corresponding to the resistance to movement that is directly encountered (operating pressure).

The programmed control means - advantageously a PID controller - will, under all dynamic conditions that occur, thus prevent more than the permissible slowing down of the diesel engine from occurring and protect the diesel engine 2 from overload or stalling.

After a certain operating pressure has been reached, the constructional machine or the vehicle begins to move. As shown in FIG. 2, on further operation of the gas pedal 25 the permissible speed depression, and thus also the maximum torque taken from the diesel engine 2 and the power taken off, becomes grearter and greater, whereby the control means can increase the power taken off from the vehicle by the driving hydraulics 13 more and more by increasing or decreasing the delivery or throughput settings of the hydraulic pump 9 or the hydraulic motor 11. If sudden peak loadings occur in working operation the control means 5 decreases the power taken off from the driving hydraulics 13 so much that the conditions do not go below the corresponding controlling characteristic curve or limiting line 47, 47.1 and the diesel engine 2 is likewise not stalled.

As FIG. 2 further shows, in the present example the maximum torque is taken off from the diesel engine at 12.5% permissible depression (relative to 800 r.p.m) and at the basic or rated speed (2200 r.p.m.).

If the permissible depression is reduced, e.g. to about 9.375% (6.25%, 3.175%) the maximum torque taken off from the diesel engine 2 amounts only to about 75% (50%, 25%) of the maximum possible torque.

There appears to be little sense in a permissible depression of the maximum speed by more than 12.5%, e.g. 20%, in the present example, since the diesel engine 2 can then no longner restore the torque that has been given up.

It is however possible, with a suitable form of the characteristic of the permissible depression (shown by way of example in FIG. 2 as a straight line), for example as a bent curve, to influence the torque takeup of the vehicle drive at low speeds and thereby to obtain a higher torque output from the diesel engine 2 (20% region in FIG. 2).

A further possible variation of the flexible form of the depression curve consists in shaping this so that the vehicle drive is depressed under load to the characteristic curve of the lowest fuel consumption.

The adjusting device 19 and possibly also 21 is of electrohydraulic construction. It comprises a cylinder 51 with a double piston 53 which is centnered by means of springs 52 and forms two workingn chambers 54, 55 in the cylinder 51 on which the hydraulic action, indicated by lines 56, 57, is regulated by an electromagnetic direction-of-drive valve in the form of a regulating valve 58 (proportional valve) of which the valve spool 59 is displaceable by electromagnets arranged on both sides of it, the action of which is controlled through the proportional amplifier 31 by the electronic control device 18.

To set up the control pressure a constant delivery auxiliary pump 61 of a known type can be used which can be driven by the driving motor 2 and in the delivery line 62 of which the control valve 58 is arranged, or else the control pressure can be taken from the working pressure in the working line 12. A pressure limiting valve is indicated by 63. Between the regulating valve 58 and the adjusting device 19 a so-called displacement feedback is provided for the purpose of comparing intended and actual values. In the present exemplary embodiment there is a mechanical displacement feedback in the form of a mechanical connection 64 between the piston 53 (or the piston rod thereof) and the housing 65 of the control valve 58, which consequently perform a relative displacement relative to the valve spool 59 dependent on the movement of the piston 53.

To sum up, the self-educating microprocessor-controlled automotive drive system with driving motor load limiting control has the following advantages:

simple modular construction on both the hardware and software sides low installation costs owing to the learning process, hardly any adjustment needed (start and finish of control, inching, etc.)

can be used both as an automotive drive and as excavator load (limiting control (in the case of possible variation in diesel engine speed)

no change in the control characteristics during its life quick and simple adaptation of the control to changes in the components of the system (new "learning" possible)

the setting of the permissible driving engine depression can be varied, and thus the course of the torque that can be taken off from the driving motor can be varied further optional electronically controlled functions can be integrated without added electronics, e.g. shifting pulse for mechanical load shift gear, tractive force limitation control, operating data monitoring and diagnosis systems, etc.

What is claimed is:

1. An automotive drive system for machines and vehicles, in particular a drive system for moving construction vehicles such as excavators, wheel loaders and caterpillar vehicles comprising a driving motor the speed of which can be continuously changed by means of a control member and a converter having control means for controlling the output speed of said converter in dependence on a depression of the speed of the driving motor determined by means of signal transmitters, wherein, if the driving motor speed resulting during operation of the drive system is greater than the driving motor speed given by a predetermined speed depression, the converter is controlled to minimum transmission ratio independently of the driving motor speed, and on reaching the predetermined speed depression the converter is controlled in dependence on the driving motor speed so that the driving motor speed does not fall below a controlling characteristic curve corresponding to the predetermined speed depression.

2. An automotive drive system according to claim 1, wherein the controlling characteristic curve corresponds to a characteristic curve that is corrected in the sense of a permissible depression of the motor speed and represents a connection between the control member and the speeds of the driving motor that result on passing through the speed range in the non-loaded state, or signals corresponding thereto.

3. An automotive drive system for machines and vehicles, in particular a drive system for moving construction vehicles such as excavators, wheel loaders and caterpillar vehicles, comprising a driving motor the speed of which can be continuously varied by means of a control member and a converter having control means for controlling its output speed in dependance on a depression of the speed of the driving motor determined by means of signal transmitters, in particular a drive system according to claim 2, wherein the control means is an electronic control means having a memory in which the relationship between the positions of the control member and the speeds that result on passing through the speed range in the nonloaded condition can be stored as a characteristic curve.

4. A drive system according to claim 3, wherein the connection between the positions of the control member and the associated speeds of the driving motor on passing through the speed range in the non-loaded condition is automatically programmed-in or learned.

5. A drive system according to claim 3, wherein the controlling characteristic curve is corrected over at least part of the range in the sense of the lowest possible fuel consumption of the driving motor.

6. A drive system according to claim 5 wherein the correction or deviation can be variably set by a set-point generator.

7. A drive system according to claim 1, wherein said control means is an electronic control device and a signal transmitter for determining the position of the control member, or a corresponding magnitude, and a signal transmitter determining the speed of the driving motor, or a corresponding magnitude, are provided and are connected to the electronic control device.

8. A drive system according to claim 1, wherein the converter is a hydrostatic transmission including at least one hydraulic pump and at least one hydraulic motor, at least one of which is of adjustable throughout and preferably reversible direction of rotation.

9. A drive system according to claim 8, wherein the hydraulic pump and/or the hydraulic motor is or are respectively adjusted by an electro-hydraulic adjusting device.

10. A drive system according to claim 1, wherein the relationship between the positions of the control member and the associated speed of the driving motor is used to detect whether there is a state of positive or negative flow of power.

11. A drive system according to claim 10, wherein in dependence on the transition to negative power flow a signal for shifting a gear box following the converter is generated to protect the driving motor, the hydraulic pump and the hydraulic motor from excessive speed.

12. An automotive drive system according to claim 2, wherein saidi non-loaded state corresponds to an idling condition of the engine.

13. A drive system according to claim 10, wherein said positive flow of power corresponds to a flow of power from the driving motor to the converter, and said negative flow of power corresponds to a flow of power from the converter to the driving motor.

14. A automotive drive system for machines and vehicles, in particular a drive system for moving construction vehicles such as wheel loaders and caterpillar vehicles comprising a driving motor the speed of which can be continuously changed by means of a control member and a converter having a control means for controlling the output speed of said converter in dependence on a load condition of the driving motor determined by means of signal transmitters, the control means being associated with an electronic control device having a memory, wherein the relationship between the control member position and the signals corresponding to the associated speeds of the driving motor that result on passing through the speed range of the driving motor in a non-loaded condition can be learned and stored automatically in the memory as a characteristic curve.

* * * * *

UNITED STATES PATENT AND TRADEMARK OFFICE
CERTIFICATE OF CORRECTION

PATENT NO. : 4,884,475

DATED : December 5, 1989

INVENTOR(S) : Winfried Walzer, et al.

It is certified that error appears in the above-identified patent and that said Letters Patent is hereby corrected as shown below:

Column 6, line 62: "longner" should read as --longer--

Column 7, line 9: "centnered" should read as --centered--

Column 7, line 10: "workingn" should read as --working--

Column 7, line 44: "load (limiting" should read as --load limiting--

Column 8, line 56: "throughout" should read as --throughput--

Column 9, line 5, Claim 12: "saidi" should read as --said--

Signed and Sealed this

First Day of January, 1991

Attest:

HARRY F. MANBECK, JR.

Attesting Officer

Commissioner of Patents and Trademarks